(12) United States Patent
Chen et al.

(10) Patent No.: US 10,454,158 B2
(45) Date of Patent: *Oct. 22, 2019

(54) PLATED, INJECTION MOLDED, AUTOMOTIVE RADAR WAVEGUIDE ANTENNA

(71) Applicant: Waymo LLC, Mountain View, CA (US)

(72) Inventors: Benjamin Chen, Mountain View, CA (US); Adam Brown, Mountain View, CA (US); Jamal Izadian, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,098

(22) Filed: Dec. 6, 2018

(65) Prior Publication Data

US 2019/0109372 A1   Apr. 11, 2019

Related U.S. Application Data

(63) Continuation of application No. 15/219,423, filed on Jul. 26, 2016, now Pat. No. 10,224,617.

(51) Int. Cl.
*H01Q 1/32*   (2006.01)
*H01Q 21/00*  (2006.01)
(Continued)

(52) U.S. Cl.
CPC ............ *H01Q 1/3233* (2013.01); *H01P 5/12* (2013.01); *H01P 11/002* (2013.01); *H01Q 1/50* (2013.01); *H01Q 9/0485* (2013.01); *H01Q 21/0037* (2013.01); *H01Q 21/0043* (2013.01); *H01Q 21/0087* (2013.01); *H01Q 21/064* (2013.01); *G01S 7/4052* (2013.01)

(58) Field of Classification Search
CPC .. H01Q 1/3233; H01Q 21/0037; H01Q 13/06; H01Q 9/0485; H01Q 13/02; H01Q 13/00; H01Q 1/50; H01Q 21/064; H01Q 21/0087; H01Q 21/0043; H01Q 1/32; H01Q 21/00; H01P 5/12; H01P 11/002
USPC ........................................ 343/713, 702, 905
See application file for complete search history.

(56) References Cited

U.S. PATENT DOCUMENTS

| 9,876,282 B1* | 1/2018 | Izadian ................. H01Q 13/06 |
| 2014/0327597 A1* | 11/2014 | Rashidian ............ H01Q 9/0485 343/905 |

* cited by examiner

*Primary Examiner* — Hai V Tran
(74) *Attorney, Agent, or Firm* — McDonnell Boehnen Hulbert & Berghoff LLP

(57) ABSTRACT

The radar system includes a split-block assembly comprising a first portion and a second portion. The first portion and the second portion form a seam, where the first portion has a top side opposite the seam and the second portion has a bottom side opposite the seam. The system includes at least one port located on a bottom side of the second portion. Additionally, the system includes radiating elements located on the top side of the first portion, wherein the radiating elements are arranged in a plurality of arrays. Yet further, the system includes a set of waveguides in the split-block assembly configured to couple each array to at least one port. Furthermore, the split-block assembly is made from a polymer and where at least the set of waveguides, the at least one port, and the plurality of radiating elements include metal on a surface of the polymer.

20 Claims, 11 Drawing Sheets

(51) Int. Cl.
*H01Q 1/50* (2006.01)
*H01Q 9/04* (2006.01)
*H01P 5/12* (2006.01)
*H01P 11/00* (2006.01)
*H01Q 21/06* (2006.01)
*G01S 7/40* (2006.01)

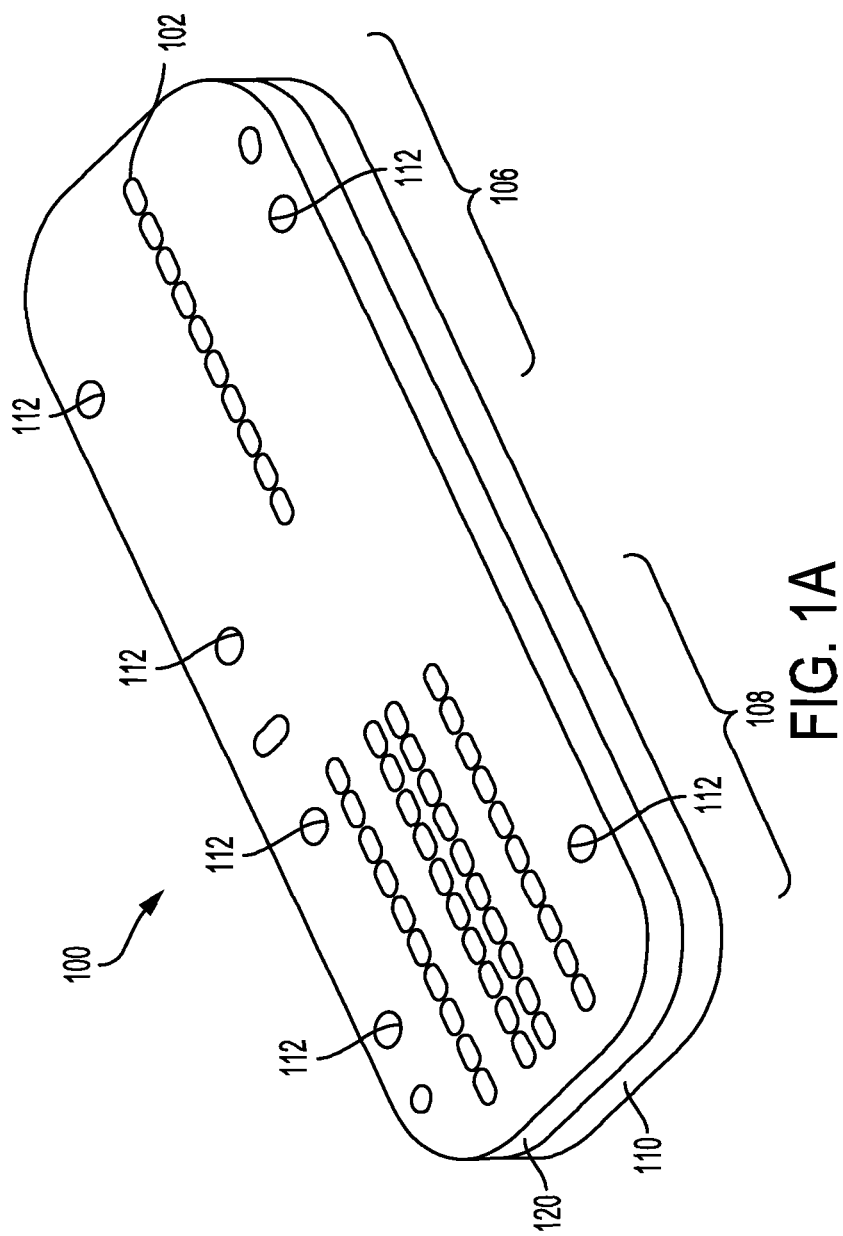

PLATED, INJECTION MOLDED, AUTOMOTIVE RADAR WAVEGUIDE ANTENNA

CROSS REFERENCE TO RELATED APPLICATION

The present application claims priority to U.S. patent application Ser. No. 15/219,423, filed on Jul. 26, 2016, the entire contents of which is herein incorporated by reference.

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wavelength (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to methods and apparatuses for a radar system. The radar system includes a split-block assembly comprising a first portion and a second portion. The first portion and the second portion form a seam, where the first portion has a top side opposite the seam and the second portion has a bottom side opposite the seam. The system further includes at least one port located on a bottom side of the second portion.

Additionally, the system includes a plurality of radiating elements located on the top side of the first portion, wherein the plurality of radiating elements is arranged in a plurality of arrays. Yet further, the system includes a set of waveguides in the split-block assembly configured to couple each array to at least one of the at least one port. Furthermore, the split-block assembly is made from a polymer and where at least the set of waveguides, the at least one port, and the plurality of radiating elements include metal on a surface of the polymer.

In another aspect, the present application describes a method of forming a waveguide antenna unit. The method includes forming a first portion of a split-block assembly from a polymer, where the first portion comprises a plurality of radiating elements located on a top side of the first portion, and where the plurality of radiating elements is arranged in a plurality of arrays. The method also includes forming a second portion of the split-block assembly from the polymer, where the second portion comprises at least one port on a bottom side of the second portion. Additionally, the method includes forming a metal surface on at least a first region of the first portion and a second region of the second portion. Yet further, the method includes assembling the split-block assembly by coupling a bottom side of the first portion and a top side of the second portion to form a seam, where the coupling forms an electrical connection between the first portion and the second portion. The seam may define a center of a set of waveguides in the split-block assembly. The set of waveguides are configured to couple each array to at least one of the at least one port. In addition, at least the set of waveguides, the at least one port, and the plurality of radiating elements comprise metal.

In yet another example, a radar system is provided. The radar system includes a radiating assembly having a plurality of portions, where each portion is made from a polymer. The radar system further includes a port formed in at least one of the plurality of portions. The port may be located on a bottom side of the radiating assembly. Additionally, the system includes a plurality of radiating elements formed in at least one of the plurality of portions. The radiating elements may be located on a top side of the radiating assembly. And, the plurality of radiating elements may be arranged in a plurality of arrays. Yet further, the system includes a set of waveguides in the radiating assembly configured to couple each array to at least one of the at least one port. Furthermore, the set of waveguides, the at least one port, and the plurality of radiating elements comprise metal on a surface of the polymer.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1A illustrates an assembled view of the top of an example antenna, in accordance with an example embodiment

DETAILED DESCRIPTION

Figure 1B:
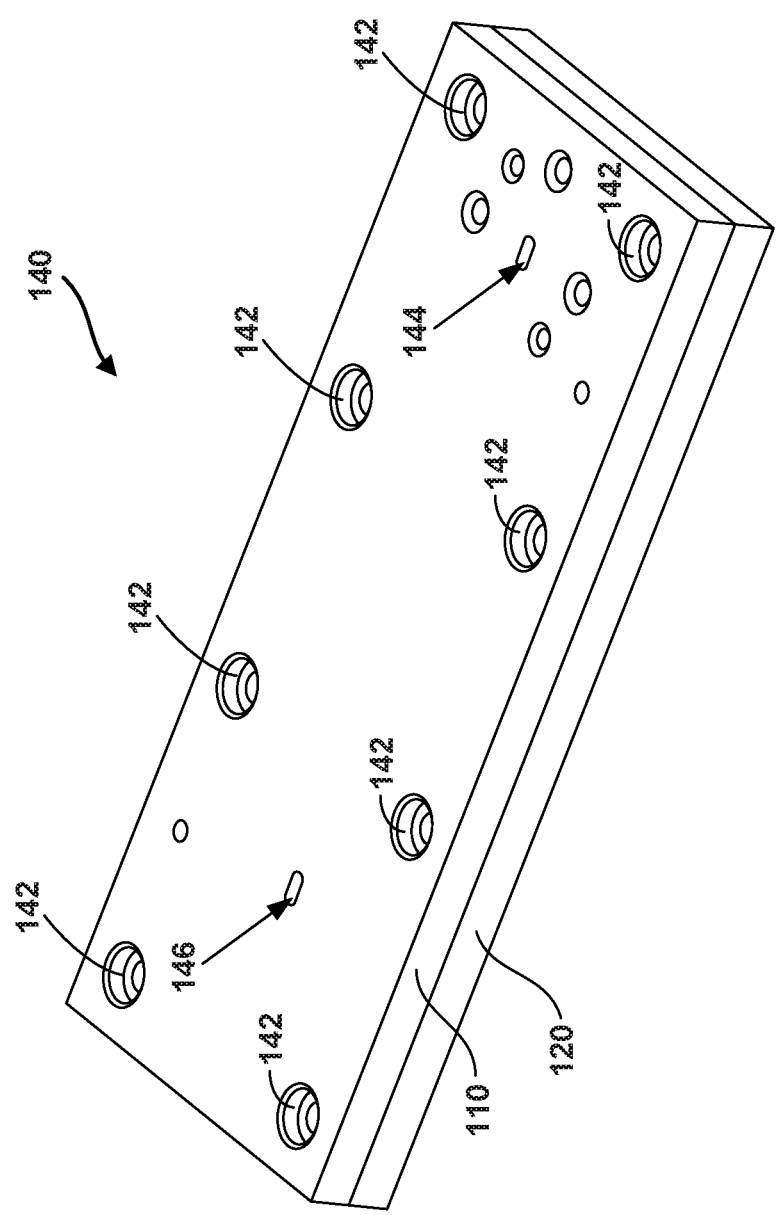
FIG. 1B illustrates an assembled view of the bottom of an example antenna, in accordance with an example embodiment

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for a radar antenna array that is constructed of a polymer material. The radar antenna array may be formed via an injection molding process. Because a conventional polymer would not conduct electromagnetic energy in the radio frequency (RF) portion of the radar antenna array well, at least a portion of the polymer surface of the radar antenna array may be coated with a metal in order to achieve a sufficient level of performance for the radar unit. The metal coating may be applied to various surfaces of the radar antenna array by many different processes. In some examples the metal coating may be allied through electroplating. In other examples, the metal coating may be applied through electroless plating or physical vapor deposition. Generally, the metallic layer has at least the thickness of a skin depth of the signal that will propagate through the waveguide. In practice, because of the high frequency of operation, the skin depth is relatively thin. Therefore, the above-discussed plating processes can produce a metallic layer of sufficient thickness for the waveguide operation.

A radar antenna array of an autonomous vehicle may include a plurality of antennas. Each antenna may be configured to (i) transmit electromagnetic signals, (ii) receive electromagnetic signals, or (iii) both transmit and receive electromagnetic signals. The antennas may form an array of antenna elements. Each antenna of the array may be fed (i.e., supplied with a signal) from a waveguide. Additionally, the waveguide may communicate signals received by the various antennas to a receiver within the radar system. Additionally, a circuit board located outside of the antenna unit may communicate signals to and from the antenna unit. As used herein, the terms electromagnetic energy, electromagnetic signals, signals, electromagnetic waves, and waves may be used interchangeably to denote the electromagnetic energy that is used with the systems and methods.

The following detailed description may be used with an apparatus having an antenna array that may take the form of a single-input single-output single-input, multiple-output (SIMO), multiple-input single-output (MISO), multiple-input multiple-output (MIMO), and/or synthetic aperture radar (SAR) radar antenna architecture. The radar antenna architecture may include a plurality of "dual open-ended waveguide" (DOEWG) antennas. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array. The radar antenna architecture described herein may include a plurality of antenna arrays.

An example antenna architecture may comprise, for example, two layers, each formed by an injection molding process, and can have a metal coating formed on the RF components of each layer of the antenna. For example, the RF components may include the input port, the waveguides, and the radiating element (i.e. antenna elements), and each may each be coated with metal. Conventional antenna architectures for radar units are formed of metal (e.g., aluminum plates) that can be machined by way of computer numerical control (CNC) and joined together. By switching to an injection molding process, the antenna units may be built more inexpensively, in less time, with tighter tolerances, and with a lower weight. The antenna units made through the injection molding process may feature the same or similar geometries for various components (such as the RF components) of the antenna unit as conventional CNC milled antenna units. The antenna units disclosed herein may be fabricated by way of an injection molding process to make a plastic cast of the antenna. At least a portion of the plastic cast may be plated with metal to create the functional RF components of the antenna.

The first layer of the antenna unit may include a first half of an input waveguide channel, where the first half of the first waveguide channel includes an input port that may be configured to receive electromagnetic waves (e.g., 77 GHz millimeter waves) into the first waveguide channel. The first layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. After having metal plating applied, the two layers may be assembled together to form a split-block assembly.

In various examples, the power dividing elements of the antenna architecture may be a two- or three-dimensional dividing network of waveguides. The dividing network of waveguides may use waveguide geometry to divide power. For example, the feed waveguides may have a predetermined height and width. The predetermined height and width may be based on a frequency of operation of the radar unit. The dividing network may include waveguides that differ in height and/or width from the predetermined height and width of the feed waveguides in order to achieve a desired taper profile.

In the present disclosure, feed waveguides that provide a signal to radiating elements (i.e. antenna elements) may be divided between the top and bottom portions of the split-block assembly. Further, the feed waveguides may all be located in a common plane where the midpoint of the height of feed waveguides is common for all of the feed waveguides. The dividing network of waveguides may be located partly in the same plane as the feed waveguides and partly in at least one other plane. For example, the entire height of a portion of the dividing network of waveguides may be molded into either the first or second portion of the split-block assembly. When the two block pieces are brought together, a surface of the other block portion may form an edge of the portion or the dividing network of waveguides that has its height fully in one of the two block sections. In some examples, the vertical portion of these waveguide cavities and cuts are symmetric with respect to the split block seam.

When operating a waveguide system, various signals may be propagated through the waveguide system. The waveguide system may include a network of waveguides each with at least one antenna element on the top surface of the antenna block. Conventionally, each antenna element would radiate a portion of the electromagnetic energy fed to it.

A waveguide is a structure that conducts electromagnetic energy from one location to another location. In some instances, conducting electromagnetic energy with a waveguide has the advantage of having less loss than other conduction means. A waveguide will typically have less loss than other conduction means because the electromagnetic energy is conducted through a very low loss medium. For example, the electromagnetic energy of a waveguide may be conducted through air or a low loss dielectric.

In one embodiment, such as an air-filled waveguide, the waveguide will have a metallic outer conductor (e.g., metal plating on the molded plastic surface). The size and shape of the waveguide define the propagation of the electromagnetic energy. For example, electromagnetic energy may bounce (or reflect) off the metallic walls of waveguide. Based on the shape and the materials of the waveguide, the propagation of the electromagnetic energy will vary. The shape and the materials of the waveguide define the boundary conditions for the electromagnetic energy. Boundary conditions are known conditions for the electromagnetic energy at the edges of the waveguide. For example, in the metallic waveguide, assuming the waveguide walls are nearly perfectly conducting, the boundary conditions specify that there is no tangentially directed electric field at any of the wall sides. Once the boundary conditions are known, Maxwell's Equations can be used to determine how electromagnetic energy propagates through the waveguide.

Maxwell's Equations may define several modes of operation for any given waveguide. Each mode has one specific way in which electromagnetic energy can propagate through the waveguide. Each mode has an associated cutoff frequency. A mode is not supported in a waveguide if the electromagnetic energy has a frequency that is below the cutoff frequency. By properly selecting both (i) waveguide dimensions and (ii) frequency of operation, electromagnetic energy may propagate through the waveguide in a specific mode. Often, waveguides are designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide. However, a suffix number of zero indicates that there is no variation of the field with respect to that direction. For example, a $TE_{10}$ mode indicates the waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e. two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Example systems within the scope of the present disclosure will now be described in greater detail. An example system with which the radar antenna array is formed by metal plating a plastic injection-molded array may be used, implemented, or may take the form of an automobile radar system, a system to test radar capabilities of an automobile radar system, or any other type of waveguide system. Additionally, example systems may be implemented in other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other systems that use waveguides can also include a radar antenna array injection molded in plastic and having metal plating.

FIG. 1A illustrates an assembled view of the top of an example antenna 100, in accordance with an example embodiment. The example antenna 100 may include a first layer 110 and a second layer 120. The second layer 120 may include a plurality of holes 112 (through-holes and/or blind-holes) configured to house alignment pins, screws, and the like. The first layer 110 may include a plurality of holes as well (not shown) that are aligned with the holes 112 of the second layer 120. The two layers may join at a common plane (i.e. the two layers may be joined at a seam).

As shown in FIG. 1A, an array 106 may include an array of DOEWG radiating elements 102, the number and position which may vary based on the number of DOEWGs and channels of the antenna 100. The radiating elements 102 of the DOEWG array may be a linear array (as shown), a two-dimensional array, a single element, or other configuration of radiating elements.

In some examples, the antenna 100 may include a transmission array 106 and a reception array 108. As previously discussed, the RF components, including the various elements of each array, may be plated with metal after initially being made through an injection molding process. Further, in an example embodiment, components other than the RF components may also be plated with metal. For example, a top and bottom surface of the antenna block may be coated with metal. In various examples, different metallic coatings are possible as well.

In some embodiments, the first and second layers 110, 120 may be injection molded from plastic and may be at least 3 mm in thickness (e.g., about 5.84 mm to 6.86 mm). Additionally, the second layer 120 may be injection molded to a thickness of about 3.886 mm. Other thicknesses are possible as well.

In some embodiments, the joining of the two layers 110, 120 may result in an air gap or other discontinuity between mating surfaces of the two layers. In such embodiments, this gap or discontinuity may be proximate to (e.g. as close as possible to) a center of the height of the antenna apparatus and may have a size of about 0.05 mm or smaller. Further, an additional thickness of metal may be plated on one or both surfaces in order to reduce or remove the air gap.

FIG. 1B illustrates an assembled view of the bottom of an example antenna 140, in accordance with an example embodiment. The antenna 140 may be the bottom of antenna 100 shown in FIG. 1A. As shown, the first layer 110 may include a plurality of holes 142 (through-holes and/or blind-holes) configured to house alignment pins, screws, and the like. One or more of the plurality of holes 142 may be aligned with the holes of the second layer 120. Further, FIG. 1B shows two ports 144, 146 in the first layer 110. The ports 144, 146 may be where the antenna 140 receives electromagnetic waves into the one or more waveguide channels located within the antenna 140. The ports 144, 146 may also be where the antenna 140 couples electromagnetic waves from the one or more waveguide channels located within the antenna 140 to subsequent processing. In some examples the ports 144, 146 may be bidirectional, configured to couple signals into and out of the antenna 140.

Figure 1C:
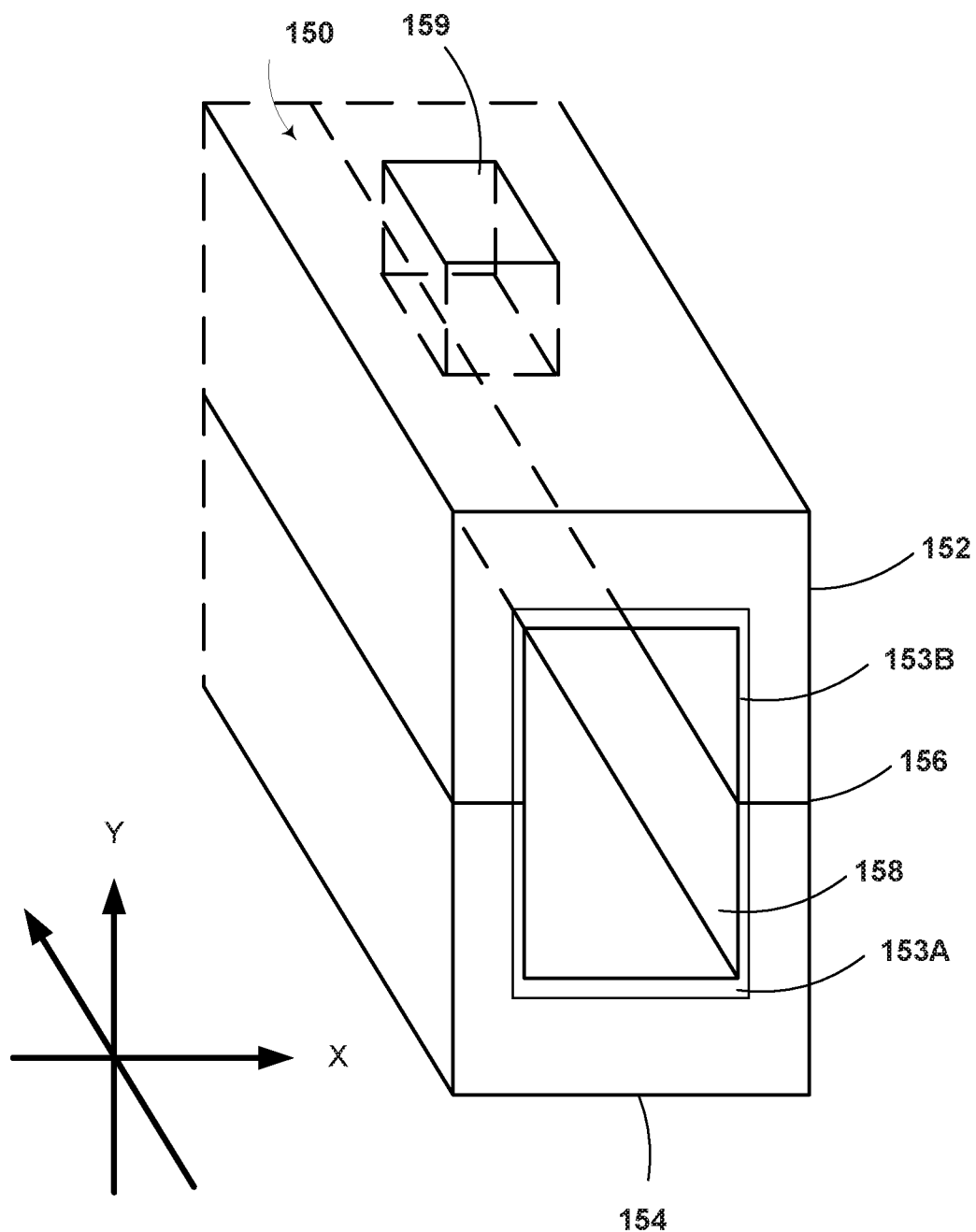
FIG. 1C illustrates an example isometric cross-section view of a waveguide having a metallic portion

FIG. 1C illustrates an example isometric cross-section view of a waveguide 150 having a metallic portion 153A, 153B. The example waveguide 150 is formed with a top portion 152 and a bottom portion 154. The top portion 152 and a bottom portion 154 are coupled at seam 156. The waveguide includes a cavity 158. Within cavity 158, electromagnetic energy propagates during the operation of waveguide 150. The waveguide 150 may also include a feed 159. Feed 159 can be used to provide electromagnetic energy to cavity 158 in waveguide 150. Alternatively or additionally, feed 159 may be used to allow electromagnetic energy to leave waveguide 150. The example waveguide 150 of FIG. 1C features seam 156 at the middle point of the height of cavity 158. In various embodiments, the top portion 152 and a bottom portion 154 may be coupled together at various different positions along an axis of the waveguide.

As shown in FIG. 1C, the top portion 152 and the bottom portion 154 may have a respective metallic portion 153A, 153B. The metallic portion 153A of the bottom portion 154 and the metallic portion 153B of the top portion 152 may each be formed through a plating process. As previously discussed, both the top portion 152 and the bottom portion 154 may be made of a polymer. The respective metallic portions 153A, 153B may be plated onto the RF surfaces, such as the internal portion of cavity 158 and the port 159. Thus, when the top portion 152 is brought into contact with the bottom portion 154, there is an electrical coupling of the respective metal portions. In the example shown in FIG. 1C, only the RF surfaces are plated. In other examples, such as those described with respect to FIGS. 1D and 1E, additional surfaces beyond just the RF surfaces may be plated as well.

Figure 1D:
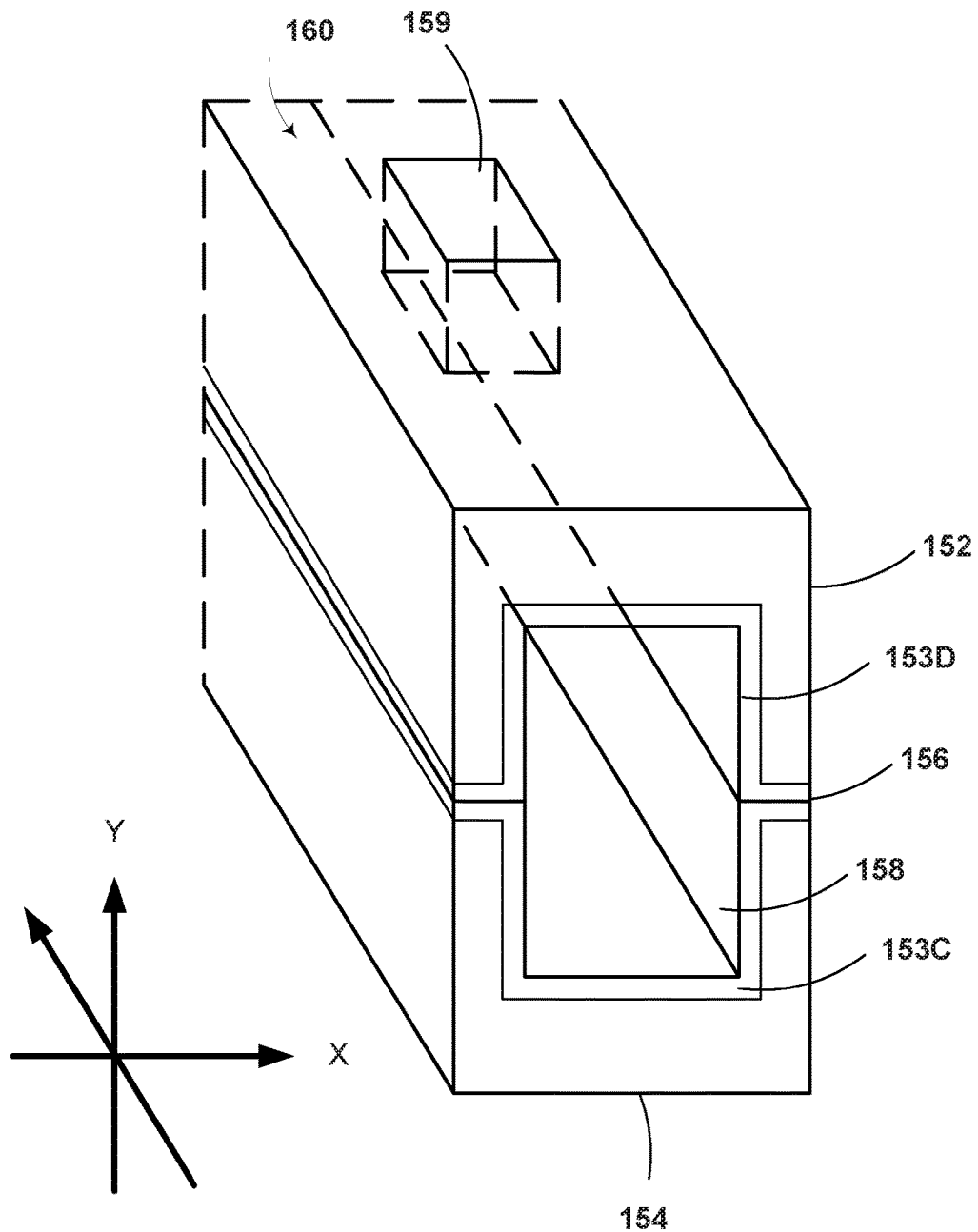
FIG. 1D illustrates an example isometric cross-section view of a waveguide having a metallic portion

FIG. 1D illustrates an example isometric cross-section view of a waveguide 160 having a metallic portion 153C, 153D. The waveguide 160 may be similar to the above-described waveguide 150, except waveguide 160 has different plating. The top portion 152 and the bottom portion 154 may have a respective metallic portion 153C, 153D. The metallic portion 153C of the bottom portion 154 and the metallic portion 153D of the top portion 152 may each be formed through a plating process. As previously discussed, both the top portion 152 and the bottom portion 154 may be made of a polymer. The respective metallic portions 153C, 153D may be played across the full surface of the respective portion. For examples, the metallic portion 153C of the bottom portion 154 may cover the entire top surface of the bottom portion 154. Additionally, the metallic portion 153D of the top portion 152 may cover the entire bottom surface of the top portion 152. Thus, when the top portion 152 is brought into contact with the bottom portion 154, there is an electrical coupling of the respective metal portions. The internal portion of cavity 158 and the port 159 may be plated with metal in this example.

Figure 1E:
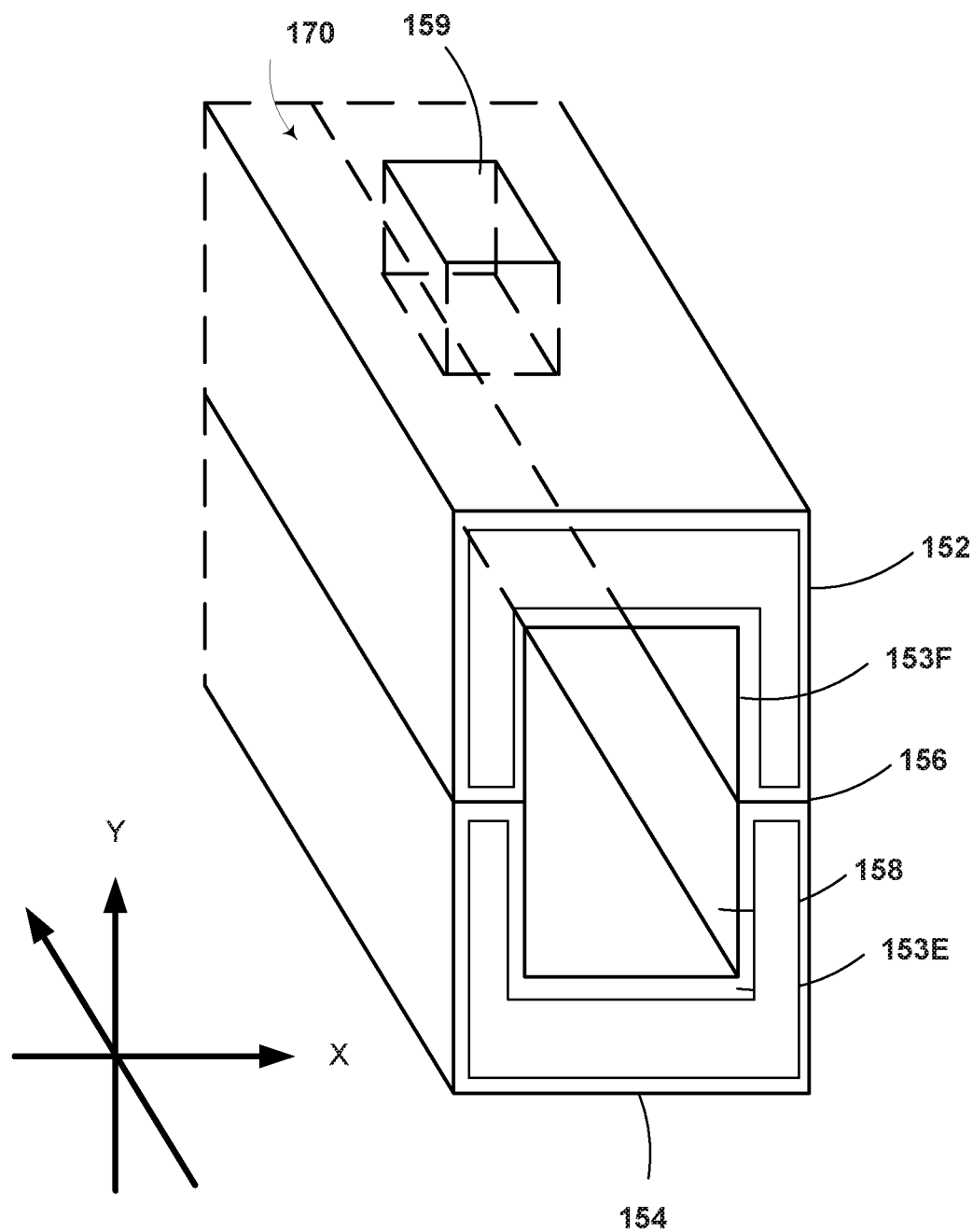
FIG. 1E illustrates an example isometric cross-section view of a waveguide having a metallic portion

FIG. 1E illustrates an example isometric cross-section view of a waveguide 170 having a metallic portion 153E, 153F. The waveguide 170 may be similar to the above-described waveguide 150, except waveguide 170 has different plating. The top portion 152 and the bottom portion 154 may have a respective metallic portion 153E, 153F. The metallic portion 153E of the bottom portion 154 and the metallic portion 153F of the top portion 152 may each be formed through a plating process. As previously discussed, both the top portion 152 and the bottom portion 154 may be made of a polymer. The respective metallic portions 153E, 153F may be played across the full surface of the respective portion. For examples, the metallic portion 153E of the bottom portion 154 may cover the entire top surface of the bottom portion 154. Additionally, the metallic portion 153F of the top portion 152 may cover the entire bottom surface of the top portion 152. Thus, when the top portion 152 is brought into contact with the bottom portion 154, there is an electrical coupling of the respective metal portions. The internal portion of cavity 158 and the port 159 may be plated with metal in this example.

Figure 2A:
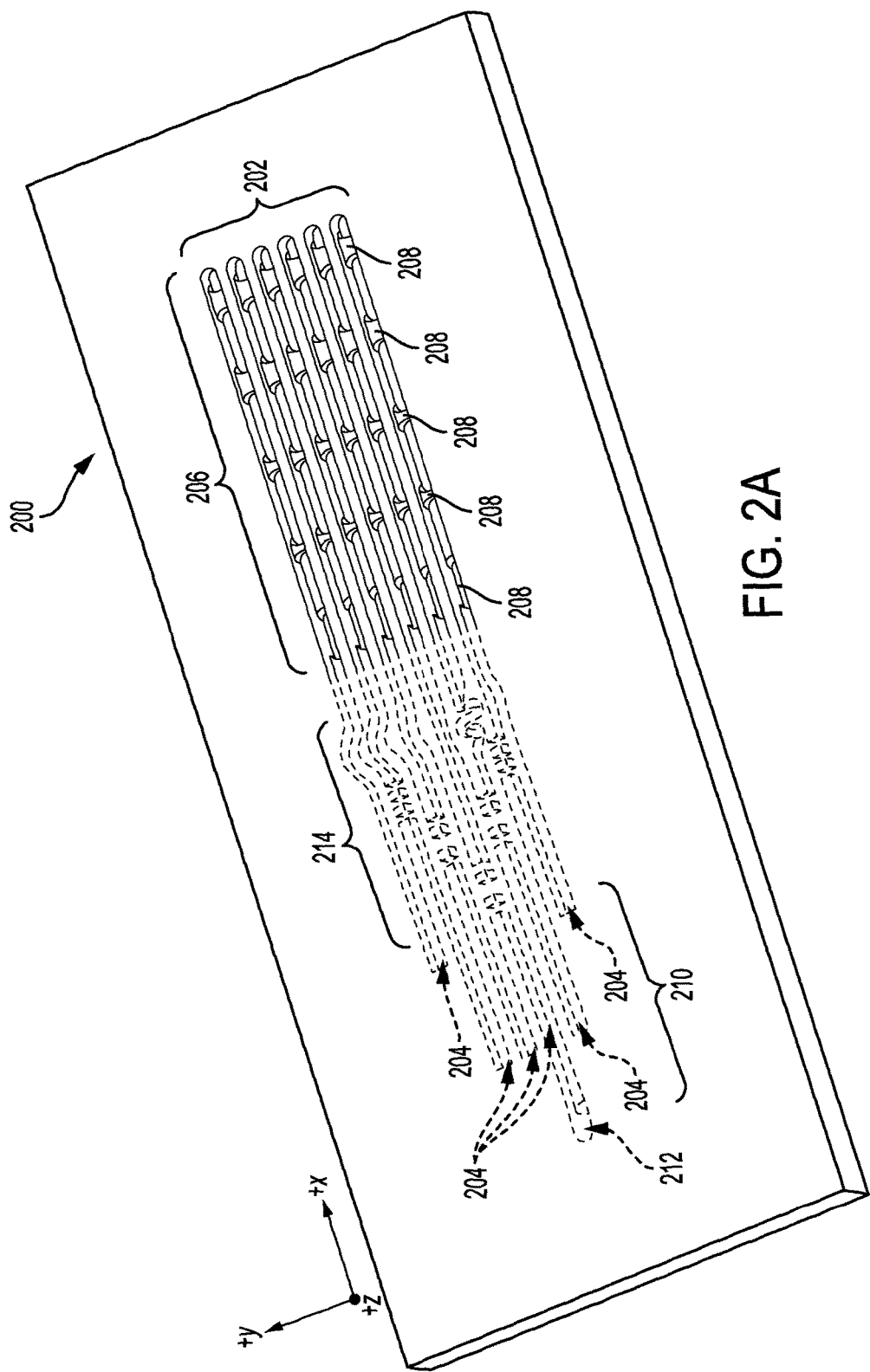
FIG. 2A illustrates a first layer of an example antenna, in accordance with an example embodiment

FIG. 2A illustrates a first layer 200 of an example antenna, in accordance with an example embodiment. The dashed lines of the waveguide (used throughout) indicate the beam-forming components of the feed waveguides. In this example, first layer 200 includes a first half of a plurality of waveguide channels 202. These waveguide channels 202 may comprise multiple elongated segments 204. At a first end 206 of each elongated segment 204 may be a plurality of collinear wave-directing members 208, each with sizes similar or different from other wave-directing members. In line with the description above, the first ends 206 of the elongated segments 204 may be referred to herein as a first half of wave-radiating channels.

At a second end 210 of the channels 202 opposite the first end 206, one of the elongated segments 204 may include a through-hole 212 (i.e., input port). A given amount of power may be used to feed a corresponding amount of electromagnetic waves (i.e., energy) into the apparatus, and the through-hole 212 may be the location where these waves are fed into the apparatus. In line with the description above, the single channel/segment of the waveguide channels 202 that includes the input port may be referred to herein as an input waveguide channel.

Upon entering the apparatus, the electromagnetic waves may generally travel in the +x direction, as shown, towards an array of power dividers 214 (i.e., a "beam-forming network"). The array 214 may function to divide up the electromagnetic waves and propagate respective portions of the waves to respective first ends 206 of each elongated segment 204. More specifically, the waves may continue to propagate in the +x direction after leaving the array 214 toward the wave-directing members 208. In line with the description above, the array 214 section of the waveguide channels may be referred to herein as wave-dividing channels.

As the portions of the electromagnetic waves reach the wave-directing members 208 at the first end 206 of each elongated segment 204 of the waveguide channels 202, the wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or molded further into the first layer 200 (i.e., a pocket). That recessed member may be configured to propagate a smaller fraction of the electromagnetic energy than each of the subsequent members further down the first end 206, which may be protruding members rather than recessed members. Further, each subsequent member may be configured to propagate a greater fraction of the electromagnetic waves travelling down that particular elongated segment 204 at the first end 206 than the member that came before it. As such, the member at the far end of the first end 206 may be configured to propagate the highest fraction of electromagnetic waves. Each wave-directing member 208 may take various shapes with various dimensions. In other examples, more than one member (or none of the members) may be recessed. Still other examples are possible as well. In addition, varying quantities of elongated segments are possible.

A second layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two injection molded layers are joined together), edges of the segments may be considered to be substantially aligned if an edge of the first half of a segment and a corresponding edge of the second half of the segment are within about ±0.051 mm of each other.

In still other examples, when joining the two layers, one layer may be angled with respect to the other layer such that their sides are not flush with one another. In such other examples, the two layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

Figure 2B:
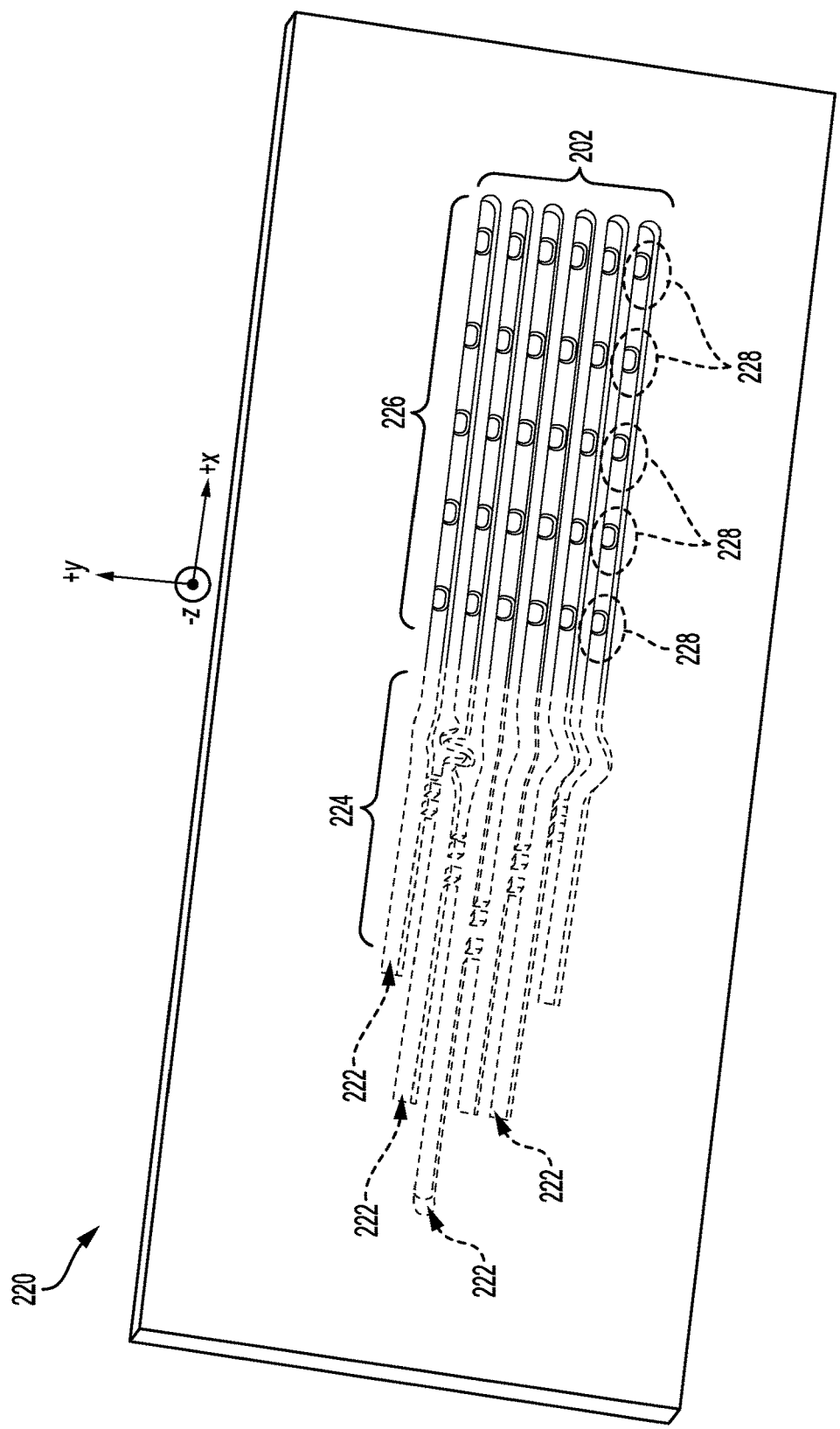
FIG. 2B illustrates a second layer of an example antenna, in accordance with an example embodiment

FIG. 2B illustrates a second layer 220 of an example antenna, in accordance with an example embodiment. The second layer 220 may include a second half of the plurality of waveguide channels 202 of the first layer 200 shown in FIG. 2A (i.e., a second half of the input waveguide channel, the wave-dividing channels, and the wave-radiating channels). As shown, the second half of the waveguide channels 202 may take on the general form of the first half of the channels, so as to facilitate proper alignment of the two halves of the channels. The elongated segments of the second half 222 may include second halves of the array of power dividers 224. As described above, electromagnetic waves may travel through the array 224, where they are divided into portions, and the portions then travel (i.e., in the +x direction, as shown) to respective ends 226 of the second halves of the elongated segments 222. Further, an end 226 of a given elongated segment may include multiple pairs of through-holes 228, which may be at least partially aligned with the wave-directing members 208 of the first layer 200. More specifically, each pair of through-holes may be at least partially aligned with a corresponding wave-directing member, also referred to as a reflecting element, such that when a given sub-portion of electromagnetic waves are propagated from the first layer 200 to the second layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/moldeded for various applications, including, but not limited to, automotive radar.

For instance, in such other embodiments, an antenna may include a minimum of a single DOEWG. With this arrangement, the output ports may radiate energy in all directions (i.e. low gain, wide beamwidth). Generally, an upper limit of segments/DOEWGs may be determined by a type of metal used for the first and second layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second layers. For instance, in embodiments described herein, at least one of the first and second layers may be aluminum. Further, in other embodiments, at least one of the first and second layers may be copper, silver, or another conductive material. Further, aluminum layers may be plated with copper, silver, or other low-resistance and/or high-conductivity materials to increase antenna performance. Other examples are possible as well.

The antenna may include at least one fastener configured to join the first layer to the second layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first layer, a first plurality of through-holes (not shown in FIG. 2A) may be configured to house the at least one fastener. Additionally, in the second layer, a second plurality of through-holes (not shown in FIG. 2B) may be substantially aligned with the first plurality of through-holes and configured to house the at least one fastener for joining the second layer to the first layer. In such embodiments, the at least one fastener may be provided into the aligned first and second pluralities of through-holes and secured in a manner such that the two layers are joined together.

In some examples, the at least one fastener may be multiple fasteners. Mechanical fasteners (and technology used to facilitate fastening) such as screws and alignment pins may be used to join (e.g., screw) the two layers together. Further, in some examples, the two layers may be joined directly to each other, with no adhesive layer in between. Still further, the two layers may be joined together using methods different than adhesion, such as snap fits, ultrasonic welding, heat staking, and the like. However, it is possible that, in other examples, such methods may be used in addition to or alternative to any methods for joining layers that are known or not yet known.

In some embodiments, one or more blind-holes may be formed into the first layer and/or into the second layer in addition to or alternative to the plurality of through-holes of the first and/or the second layer. In such embodiments, the one or more blind-holes may be used for fastening (e.g., housing screws or alignment pins) or may be used for other purposes.

Figure 3:
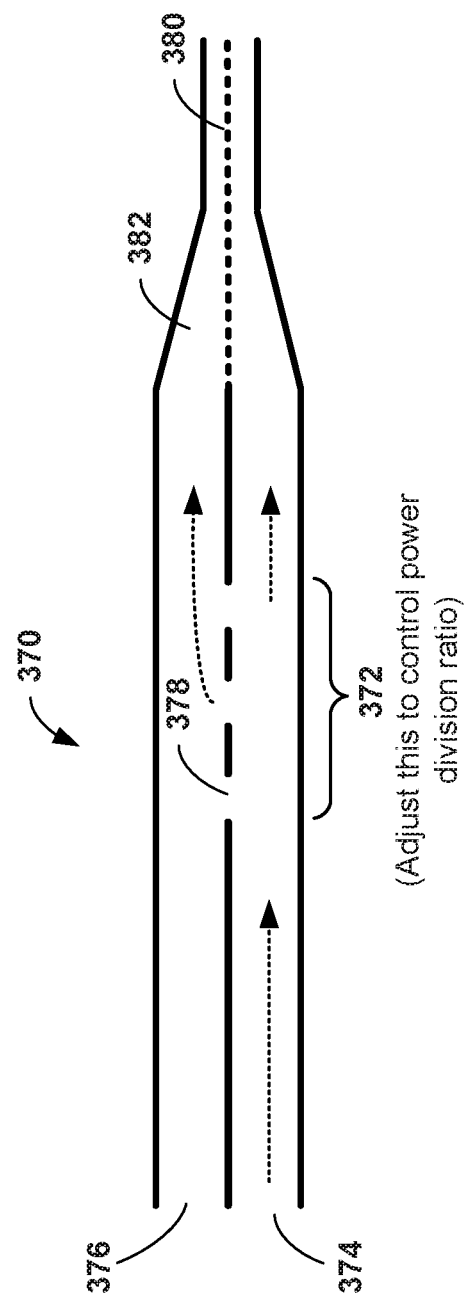
FIG. 3 illustrates an example power coupler, in accordance with an example embodiment

FIG. 3 illustrates an example power coupler, in accordance with an example embodiment. The power coupler may function to divide electromagnetic energy (i.e. power) that is in the waveguides. A power coupler is formed between two sections of waveguides that are aligned vertically adjacent or horizontally adjacent to each other. The power coupler may be one of the RF components that is formed of metal plated plastic.

Energy may enter the antenna through an input waveguide channel and is divided (i.e., split) into smaller portions of energy at each power divider, such as power divider 370, and may be divided multiple times via subsequent power dividers so that a respective amount of energy is fed into each of the feed waveguides. The amount of energy that is divided at a given power divider may be controlled by a power division ratio (i.e., how much energy goes into one channel 374 versus how much energy goes into another channel 376 after the division). A given power division ratio may be adjusted based on the dimensions of the corresponding power divider. Further, each power divider and associated power division ratio may be designed/calculated in order to achieve a desired "power taper" at the wave-radiating channels.

Within examples, (such as that shown in FIG. 3) a technique for dividing energy between two adjacent waveguides 374, 376 may be to use a layer with a coupling aperture 372 such as that shown in FIG. 3. By adjusting the size, shape, and location of the coupling aperture 372, a desired taper profile may be achieved. Further, two adjacent waveguides, each located in a different split block section may couple to ramp section 382 to form a single waveguide. The single waveguide after the ramp section may be located in the common plane of the split-block assembly 380.

Figure 4:
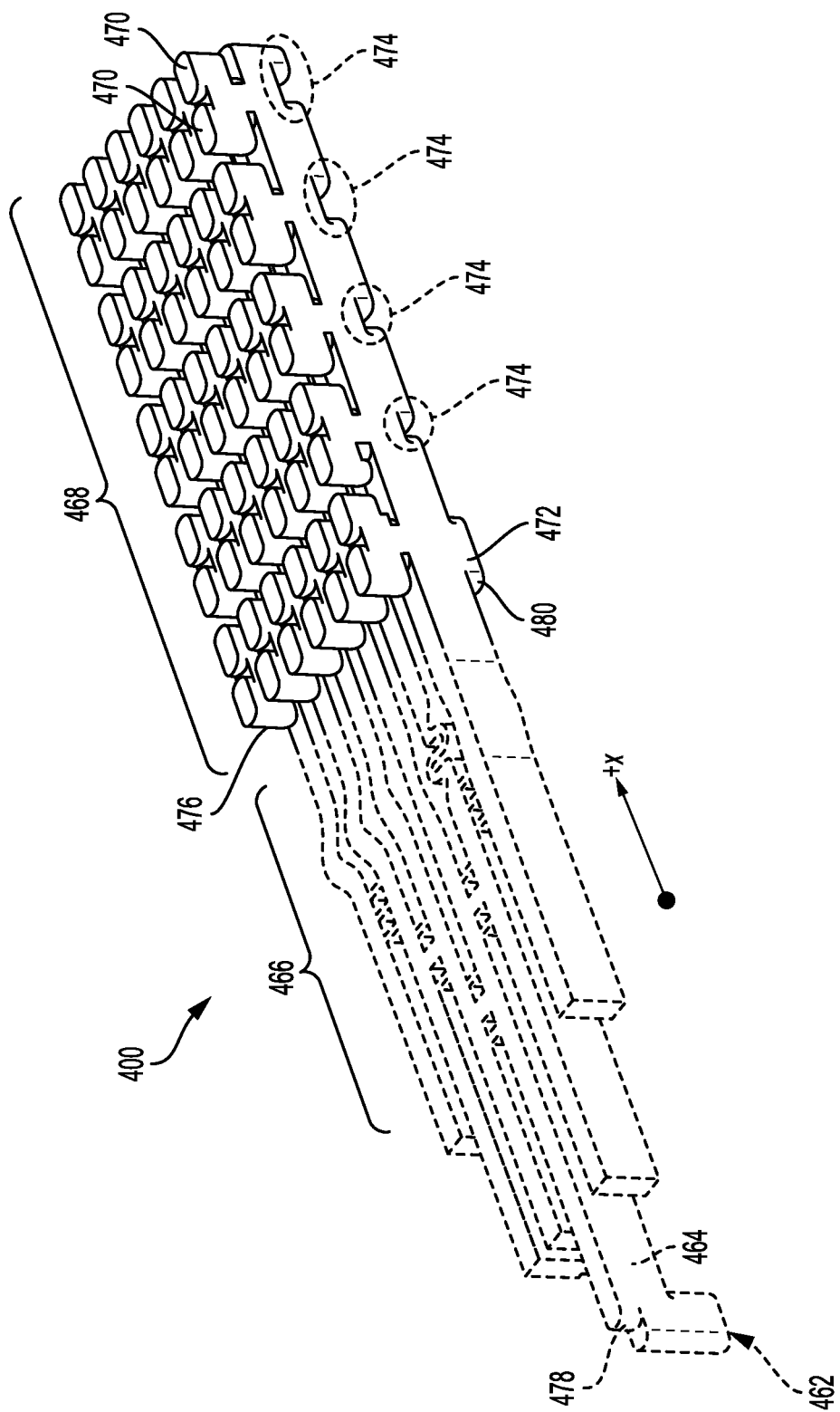
FIG. 4 illustrates conceptual waveguide channels formed inside an assembled example antenna, in accordance with an example embodiment

FIG. 4 illustrates conceptual waveguide channels 400 and other RF components formed inside an assembled example antenna. More particularly, the waveguide channels 400 take the form of the waveguide channels 202 of FIGS. 2A and 2B. For instance, the channels 400 include an input port 462 to the input waveguide channel 464. The channels 400 also include wave-dividing channels 466 and a plurality of radiating doublets 468 (i.e., a DOEWG array). As described above, when electromagnetic waves enter the channels 400 at the input port 462, they may travel in the +x direction through the input waveguide channel 464 and be divided into portions by the wave-dividing channels 466 (e.g., by the power dividers). Those portions of electromagnetic waves may then travel in the +x direction to respective radiating doublets 468, where sub-portions of those portions are radiated out each DOEWG through pairs of output ports, such as radiating pair 470, for instance.

In a particular wave-radiating channel, a portion of electromagnetic waves may first be propagated through a first DOEWG with a recessed wave-directing member 472 (i.e., an inverse step, or "well"), as discussed above. This recessed wave-directing member 472 may be configured to radiate the smallest fraction of energy of all the members of the DOEWGs of the particular wave-radiating channel. In some examples, subsequent wave-directing members 474 may be formed (e.g., protruded, rather than recessed) such that each subsequent DOEWG can radiate a higher fraction of the remaining energy than the DOEWG that came before it. Phrased another way, each wave-directing member 472, 474 may generally be formed as a step into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna. In some embodiments, the first and second layers may be molded such that various sides of the waveguide channels 400 have rounded edges, such as edge 476, 478, and 480, for example.

Figure 5:
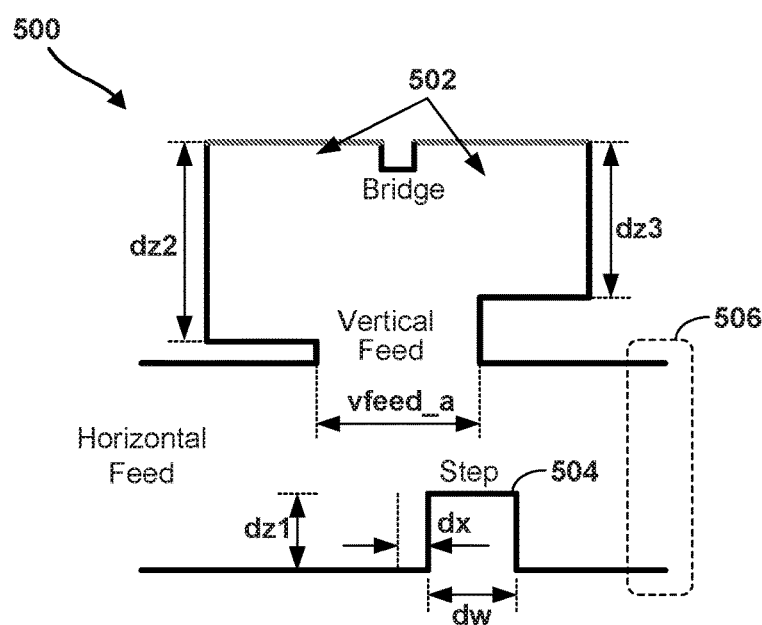
FIG. 5 illustrates an example wave-radiating portion of an example antenna, in accordance with an example embodiment

FIG. 5 illustrates an example wave-radiating portion 500 of an example antenna, in accordance with an example embodiment. The wave-radiating portion 500 of FIG. 5 illustrates an example wave-radiating doublet of an example antenna, in accordance with an example embodiment. More specifically, FIG. 5 illustrates a cross-section of an example DOEWG 500. As noted above, a DOEWG 500 may include a horizontal feed (i.e., channel), a vertical feed (i.e. a doublet neck), and a wave-directing member 504. The vertical feed may be configured to couple energy from the horizontal feed to two output ports 502, each of which is configured to radiate at least a portion of electromagnetic waves out of the DOEWG 500. In some embodiments, the farthest DOEWG from the input port may include a backstop at location 506. The backstop may be an end or a termination of the respective waveguide. DOEWGs that come before the last DOEWG may simply be open at location 506 and electromagnetic waves may propagate through that location 506 to subsequent DOEWGs. For example, a plurality of DOEWGs may be connected in series where the horizontal feed is common across the plurality of DOEWGs. FIG. 5 shows various parameters that may be adjusted to tune the amplitude and/or phase of an electromagnetic signal that couples into the radiating element.

In order to tune a DOEWG such as DOEWG 500, the vertical feed width, vfeed_a, and various dimensions of the step 504 (e.g., dw, dx, and dz1) may be tuned to achieve different fractions of radiated energy out the DOEWG 500. The step 504 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed.

In some examples, each output port 502 of the DOEWG 500 may have an associated phase and amplitude. In order to achieve the desired phase and amplitude for each output port 502, various geometry components may be adjusted. As previously discussed, the step (reflecting component) 504 may direct a portion of the electromagnetic wave through the vertical feed. In order to adjust an amplitude associated with each output port 502 of a respective DOEWG 500, a height associated with each output port 502 may be adjusted. Further, the height associated with each output port 502 could be the height or the the depths of this feed section of output port 502, and not only could be a height or depth adjustment but it could be a multiplicity of these changes or steps or ascending or descending heights or depths in general.

As shown in FIG. 5, height dz2 and height dz3 may be adjusted to control the amplitude with respect to the two output ports 502. The adjustments to height dz2 and height dz3 may alter the physical dimensions of the doublet neck (e.g. vertical feed of FIG. 5). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 502 associated with (i.e. located adjacent to) height dz2 may radiate with a greater amplitude than the amplitude of the signal radiated by the output port 502 associated with height dz3.

Figure 6:
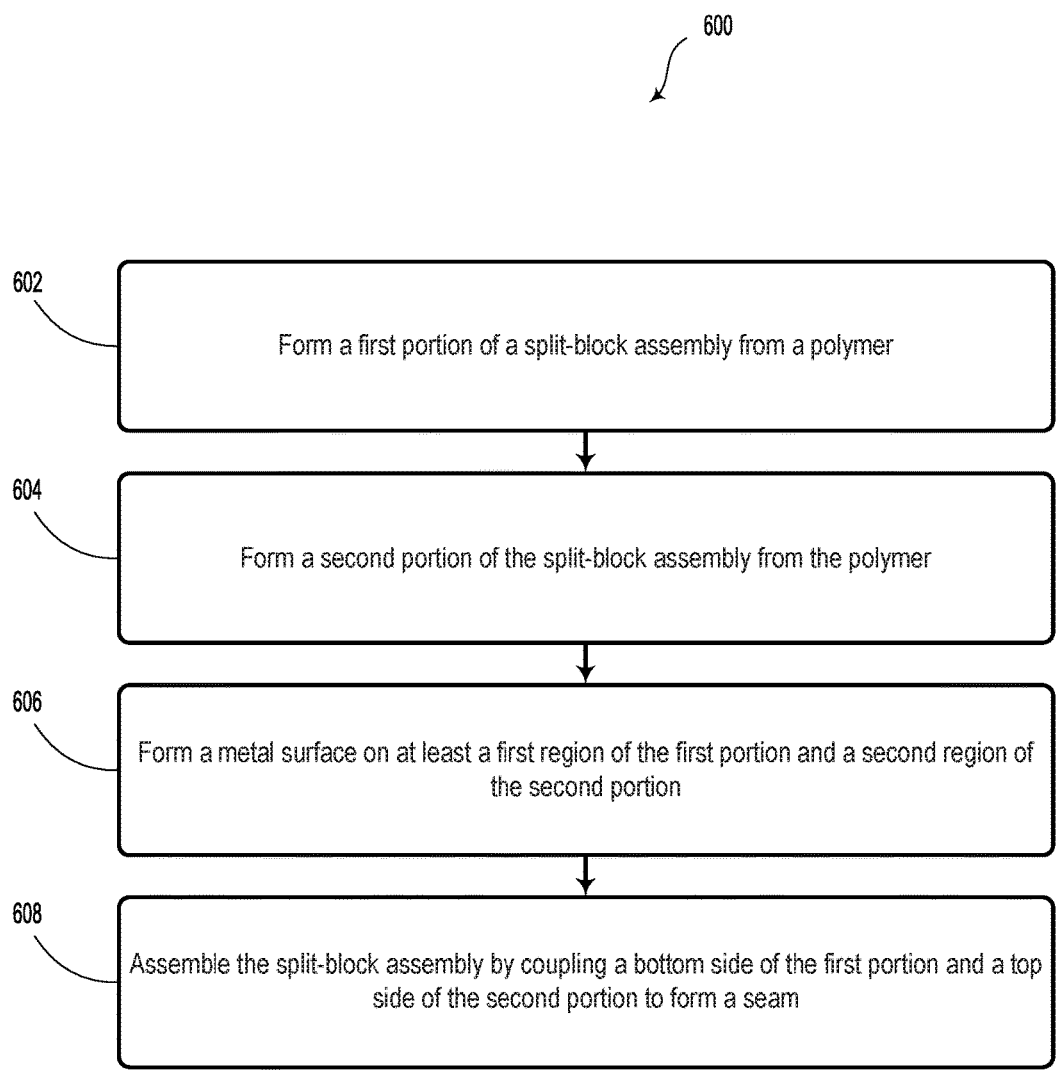
FIG. 6 illustrates a method of forming a waveguide antenna unit in accordance with an example embodiment

FIG. 6 illustrates a method 600 of constructing an example antenna. The method 600 may begin at block 602 by forming a first portion of a split-block assembly from a polymer. At block 604, the method 600 includes forming a second portion of a split-block assembly from the polymer. The first and second portions may each be one of the top and bottom portions of the previously-described waveguide antennas. The respective portions may be formed through a polymer (e.g. plastic) injection molding process. Through the injection molding, the various structures of each respective waveguide portion can be formed. In some further examples, the final antenna may include more than two portions as described here. In some examples, blocks 602 and 604 may involve constructing more than two portions to create the final antenna. For example, some antennas may be constructed with three (or more) layers or portions. Additionally, in order to reduce weight, the plastic portions may further be hollowed out after the molding process.

In practice, injection molding may allow the various features of the antenna to be construction with more precise tolerances and with fewer restrictions on geometry as compared to conventional CNC machining processes. For example, some features may be created by injection molding that are not possible (or commercially practical) to create via CNC processes. In various examples, each half may be molded with the desired final dimensions for the various features of the antenna. Because the metal plating (applied at block 606) is relatively thin, it will not significantly change the dimensions of the various elements to which plating is applied.

At block 606, the method 600 includes forming a metal surface on at least a first region of the first portion and a second region of the second portion. The RF component of the antenna, including at least the set of waveguides, the at least one port, and the plurality of radiating elements may be coated with metal. As previously described, a frequency of operation of the antenna may be 77 GHz. At this frequency a skin depth (the depth at which signals propagate into a metal surface) is approximately 0.25 micron. If the thickness of the metal plating is less than a skin depth, it may create some undesired effects when propagating a signal. In practice, a layer at least four or five times as thick as the skin depth may be used to make sure the metal is sufficiently thick. Therefore, in some examples, the metal plating may be between 3 and 15 microns thick.

In various examples, different metals may be used to create the plating. Generally, a metal that is both highly conductive and non-magnetic may be used for the plating. In practice, metals such as copper, silver, and gold may be used for the plating. Other metals, or a combination of metals may be used as well. In some examples, a metal may be selected based on the metal's ability to adhere to the plastic surface of the respective portions.

As previously described with respect to FIG. 1C-1E, various surfaces may be plated depending on the embodiment. In some examples, only the surfaces that will interact with RF signals may be plated. In other examples, an entire surface of the respective portion may be plated. In yet further examples, all (or a majority of) the external surfaces of a respective portion may be plated with metal.

At block 608, the method 600 includes assembling the split-block assembly by coupling a bottom side of the first portion and a top side of the second portion to form a seam. The coupling forms an electrical connection between the first portion and the second portion and the seam defines a center of a set of waveguides in the split-block assembly. The set of waveguides may be configured to couple each array to at least one of the at least one port. The two portions are coupled to each other by various means, including fastening by heat staking, welding, or adhesives, or physically coupled by screws, pins, clips, or other means. When coupled, the two portions may be electrically coupled to each other. That is, at least the RF portions of the waveguide may have a metal portion in contact with the respective waveguide on the adjacent portion.

Additionally, the antenna may have a circuit board configured to interface with the antenna. The circuit board may be configured to couple signals into and out of the antenna. For example, components on the circuit board may inject signals for transmission into the antenna. Additionally, the circuit board may also be configured to couple received signals out of the antenna. The circuit board may be mounted on a bottom portion of the antenna block, where the port of the antenna block is located. In some further examples, the circuit board may be electrically coupled to the antenna block as well, via metal surfaces on the circuit board and the antenna block.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
a split-block assembly comprising a plurality of portions;
at least one port located on a bottom side of one portion of the plurality of portions;
a plurality of radiating elements located on a top side of one portion of the plurality of portions; and
a set of waveguides in the split-block assembly configured to couple the plurality of radiating elements to at least one of the at least one port,
wherein the split-block assembly comprises a polymer and wherein at least the set of waveguides, the at least one port, and the plurality of radiating elements comprise metal on a surface of the polymer, wherein the polymer is formed by an injection molding process.

2. The radar system according to claim 1, wherein the split-block assembly comprises at least one seam between a first portion and a second portion of the plurality of portions.

3. The radar system according to claim 2, wherein a top side of the second portion and a bottom side of the first portion form the seam and wherein the first and second portions are electrically coupled at the seam.

4. The radar system according to claim 3, wherein the top side of the second portion and the bottom side of the first portion each have a respective region that is covered with a layer.

5. The radar system according to claim 1, further comprising a circuit board physically coupled to the bottom side adjacent to the port.

6. The radar system according to claim 5, wherein the circuit board is electrically coupled to a metallic portion of the bottom side.

7. The radar system according to claim 1, wherein the metal on the surface of the polymer is between 3 and 15 microns thick.

8. The radar system according to claim 1, wherein the set of waveguides has a height, and wherein the seam is located at a center of the height of the waveguides.

9. A method of forming a waveguide antenna unit comprising:
forming a plurality of portions of a split-block assembly from a polymer, wherein a top portion comprises a plurality of radiating elements located on a top side of the top portion, wherein a bottom portion comprises at least one port on a bottom side of the bottom portion;
forming a metal surface on at least a region of each portion; and
assembling the split-block assembly by coupling the plurality of portions together, wherein the coupling forms an electrical connection between the coupled portions, and wherein a set of waveguides is configured to couple each array to at least one of the at least one port,
wherein at least the set of waveguides, the at least one port, and the plurality of radiating elements comprise metal, wherein each portion is each formed by an injection molding process.

10. The method according to claim 9, wherein a location where two portions, of the plurality of portions, couple forms a seam and wherein the seam defines a center of the set of waveguides in the split-block assembly.

11. The method according to claim 9, wherein the region of the top portion is on the bottom side of the top portion and the region of the bottom portion is on the top side of the bottom portion.

12. The method according to claim 9, further comprising physically coupling a circuit board to the bottom side adjacent to the port.

13. The method according to claim 9, further comprising electrically coupling the circuit board to the bottom side adjacent to the port.

14. The method according to claim 9, wherein forming the metal surface comprises forming a layer on the polymer, wherein the layer is between 3 and 15 microns thick.

15. A radar system comprising:
a radiating assembly comprising a plurality of portions, wherein each portion comprises a polymer;
a port formed in at least one of the plurality of portions, and located on a bottom side of the radiating assembly;
a plurality of radiating elements formed in at least one of the plurality of portions, and located on a top side of the radiating assembly, wherein the plurality of radiating elements is arranged in at least one array; and
a set of waveguides in the radiating assembly configured to couple the plurality of radiating elements to the port,
wherein the set of waveguides, the at least one port, and the plurality of radiating elements comprise metal on a surface of the polymer, wherein the polymer is formed by an injection molding process.

16. The radar system according to claim 15, wherein the radiating assembly comprises at least one seam between a first portion and a second portion of the plurality of portions.

17. The radar system according to claim 15, wherein adjacent portions of the plurality of portions are electrically coupled to each other.

18. The radar system according to claim 15, further comprising a circuit board physically coupled to the bottom side of the radiating assembly.

19. The radar system according to claim 18, wherein the circuit board is electrically coupled to a metallic portion of the bottom side of the radiating assembly.

20. The radar system according to claim 15, wherein the metal on the surface of the polymer is between 3 and 15 microns thick.

\* \* \* \* \*